United States Patent

[11] 3,612,906

| [72] | Inventor | Peter D. Kennedy<br>Casselberry, Fla. |
|---|---|---|
| [21] | Appl. No. | 76,142 |
| [22] | Filed | Sept. 28, 1970 |
| [45] | Patented | Oct. 12, 1971 |
| [73] | Assignee | The United States of America as represented by the Secretary of the Navy |

[54] PULSE SYNCHRONIZER
3 Claims, 3 Drawing Figs.

[52] U.S. Cl. ................................................ 307/269,
178/69.5, 307/215, 307/247, 328/63, 328/72,
340/172.5
[51] Int. Cl. ....................................................... H03k 17/26
[50] Field of Search ............................................ 178/69.5;
307/215, 232, 247, 269; 328/63, 72; 340/172.5

[56] References Cited
UNITED STATES PATENTS

| 3,225,301 | 12/1965 | McCann ....................... | 307/218 X |
| 3,267,381 | 8/1966 | Thornberg et al. ............ | 307/215 X |
| 3,407,389 | 10/1968 | Klein ............................. | 307/247 X |
| 3,471,790 | 10/1969 | Kaps .............................. | 328/72 X |
| 3,518,552 | 6/1970 | Carlow .......................... | 307/215 X |

Primary Examiner—Donald D. Forrer
Assistant Examiner—R. C. Woodbridge
Attorneys—Richard S. Sciascia, John W. Pease and John F. Miller ABSTRACT: A pulse synchronizer employing two bistable flip-flops and a NAND gate is used to pass the first complete clock pulse which arrives after the incidence of a sample pulse.

PETER D. KENNEDY
INVENTOR

By John F. Miller
Agent

John M. Pierce
Attorney

3,612,906

PULSE SYNCHRONIZER

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

The invention is in the field of logic circuits. In the prior art a need has existed for means for synchronizing sampling or information pulses with the recurrent clock pulses of a system when the information pulses might be of random frequency and duration. For example, in devices such as recirculating delay lines and other storage apparatus, recirculating sample pulses may drift out of synchronism with the system clock because of various circuit imperfections, aging components, and other causes. Various expedients have been tried in the prior art with incomplete success. The invention overcomes the problems of the prior art by providing a novel synchronizing circuit which functions regardless of the relative phase, duration, or frequency, of the sample pulses.

SUMMARY OF THE INVENTION

The invention comprises a combination of control flip-flops and gating means arranged to receive incoming sample pulses and clock pulses. The logic is such that the invention generates an output signal which is always the first complete clock pulse occurring after the beginning of a sample pulse.

DESCRIPTION OF THE PREFERRED EMBODIMENT

Figure 1:
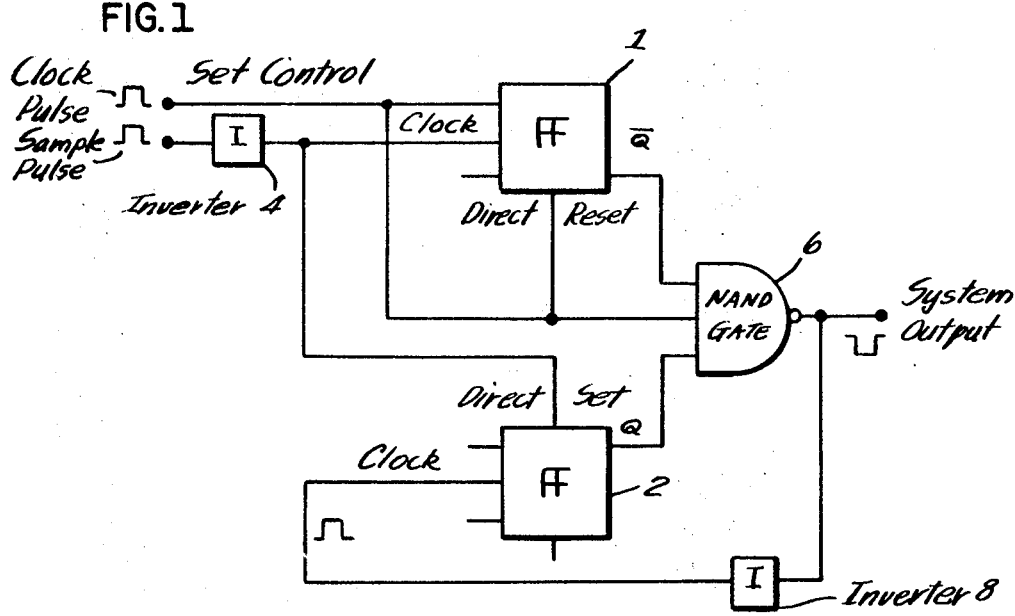
FIG. 1 is a block diagram of the invention.

The circuit of the invention is shown in FIG. 1. Here, positive sample pulses which may, for example, be recirculating in a delay line memory, are inverted in an inverter 4 and applied to the "clock" input terminal of a flip-flop 1 and to a "direct set" input terminal of a flip-flop 2. Periodic positive clock pulses are applied to the "set control" and to the "direct reset" input terminals of flip-flop 1 and to one input of a three input NAND-gate 6. A "Q̄" output of flip-flop 1 is applied to a third input to NAND-gate 6. The output signal from NAND-gate 6 is the system output. This output signal is inverted in an inverter 8 and furnished to the "clock" input terminal of flip-flop 2.

Figure 2:
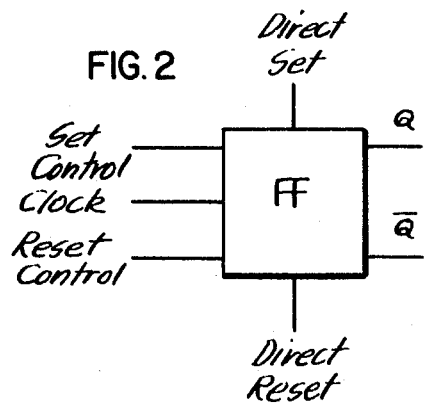
FIG. 2 shows a flip-flop suitable for use as a control flip-flop in the invention.

An example of flip-flops 1 and 2, which are commercially available components, is shown in FIG. 2. Flip-flops 1 and 2 have a "set control" input, a "reset control" input, a "clock" input, a "direct set" input, and a "direct reset" input, Two output terminals Q and Q̄ are shown. A positive signal on one of the synchronous input terminals "set control" or "reset control" when a signal is on the "clock" input terminal will cause the flip-flop to "set" or "reset" depending on which terminal receives a signal. Switching will occur as the "clock" input falls from a positive to a more negative value. If both the "set control" and "reset control" are positive, or left open, a signal on the "clock" input will cause the flip-flop to toggle. A signal on one of the asynchronous input terminals "direct set" or "direct reset" will cause the flip-flop to set or reset. When the flip-flop is "set" the Q output terminal will be "high." When the flip-flop is reset the Q̄ output terminal will be high.

Flip-flops 1 and 2 are normally reset. In the reset condition flip-flop 1 supplies an enabling signal Q̄ to one input of three input NAND gate 6. Flip-flop 2 in a reset condition supplies a disabling or inhibiting voltage Q to an input of gate 6 over the connection shown. THe reset control input of flip-flop 1 and the set control and reset control inputs of flip-flop 2 are left open. The set control input of flip-flop 1 is held at a negative potential (ground) in the absence of a clock pulse.

When there are no sample pulses on the clock input to flip-flop 1, the clock pulses which arrive at the set control input of flip-flop 1 have no effect on 1 or on NAND gate 6. They are applied to the direct reset input of flip-flop 1 over the connection shown and keep 1 in a reset condition.

Figure 3:
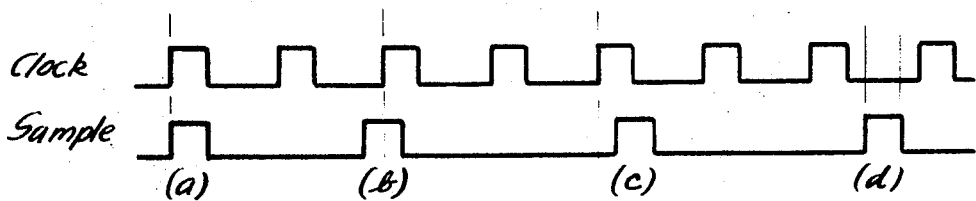
FIG. 3 shows some out-of-phase conditions between sample pulses and clock pulses.

If a sample pulse arrives coincident with a clock pulse as shown at (a) in FIG. 3, flip-flop 2 is set by the sample pulse applied to its direct set input. In its set condition, 2 applies an enabling voltage to NAND gate 6 so that the clock pulse on the center input of gate 6 is passed by 6 to the system output. The output pulse from 6 is inverted and applied as a positive pulse to the clock input of flip-flop 2 where its trailing edge, falling sharply from a positive value to a more negative value, resets flip-flop 2.

If a sample pulse leads a clock pulse somewhat, as shown at (b) in FIG. 3, the two pulses being only partially coincident, the sample pulse will set flip-flop 2 to enable gate 6 to pass the trailing clock pulse when it arrives. Flip-flop 2 will remain set until reset by the trailing edge of the system output pulse from gate 6. The clock pulse will not affect flip-flop 1, which will remain in a reset condition.

If a sample pulse lags a clock pulse, as shown at (c) in FIG. 3 being partially coincident therewith, it will be applied to the clock input of flip-flop 1 when the clock pulse voltage is on the set control input of flip-flop 1. This will set flip-flop 1 which will apply a disabling voltage to NAND gate 6 to prevent the clock pulse from being passed by gate 6 even though flip-flop 2 is set by the sample pulse. Flip-flop 1 will be reset at the end of the clock pulse when the clock pulse goes negative. The next following clock pulse will be passed by gate 6 to the system output. If a sample pulse should occur between two clock pulses as shown at (d) in FIG. 3, the result will be the same, that is, the next following clock pulse will be passed.

Thus, regardless of the duration or degree of synchronization of the sample pulses, the system will pass only the first complete clock pulse following a sample pulse.

What is claimed is:

1. In a synchronizing system, the improvement comprising:
   a first synchronous flip-flop,
   a second synchronous flip-flop, said flip-flops each having a clock input terminal, a set control input terminal, a direct set input terminal, a direct reset input terminal, and a first and a second complementary output terminal,
   a NAND gate,
   means connecting an output of each of said flip-flops to inputs of said NAND gate,
   means for furnishing clock pulses to said NAND gate,
   means for furnishing sample pulses to said first flip-flop, and connecting means whereby said NAND gate is enabled by said flip-flops to pass the first complete clock pulse arriving after the incidence of a sample pulse, to the output of said system.

2. The apparatus of claim 1,
   a first output of said first flip-flop being connected to an input of said NAND gate to enable said gate when in a reset condition,
   a second output of said second flip-flop being connected to an input of said NAND gate to enable said gate when in a set condition,
   said connecting means including means for supplying sample pulses to the clock input of said first flip-flop, and to the direct set input of said second flip-flop, and
   means for supplying clock pulses to the set control input and to the direct reset input of said first flip-flop.

3. The apparatus of claim 2 and including a feedback connection from the output of said NAND gate to the clock input of said second flip-flop,
   a first inverter in said feedback connection to invert a negative output pulse from said NAND gate to furnish a positive going pulse to the clock input of said second flip-flop, said second flip-flop being adapted to reset at the trailing edge of said positive going pulse, and a second inverter means arranged to invert said sample pulses.